United States Patent
Salam et al.

(10) Patent No.: US 8,122,278 B2
(45) Date of Patent: Feb. 21, 2012

(54) CLOCK SKEW MEASUREMENT FOR MULTIPROCESSOR SYSTEMS

(75) Inventors: Sudheer Abdul Salam, Sunnyvale, CA (US); Binu J. Philip, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 466 days.

(21) Appl. No.: 12/430,992

(22) Filed: Apr. 28, 2009

(65) Prior Publication Data

US 2010/0275053 A1     Oct. 28, 2010

(51) Int. Cl.
     *G06F 1/12*      (2006.01)
(52) U.S. Cl. .................. 713/503; 713/500
(58) Field of Classification Search .......... 713/400, 713/500, 502, 503; 702/89, 187
See application file for complete search history.

(56) References Cited

U.S. PATENT DOCUMENTS

| | | | |
|---|---|---|---|
| 7,188,052 B2 | 3/2007 | Levine et al. | |
| 7,394,830 B2 * | 7/2008 | Chapman | 370/503 |
| 2007/0162244 A1 * | 7/2007 | Horikawa | 702/89 |
| 2007/0192543 A1 * | 8/2007 | Naik et al. | 711/133 |
| 2008/0126827 A1 * | 5/2008 | Fricano et al. | 713/600 |

\* cited by examiner

*Primary Examiner* — Paul Yanchus, III
(74) *Attorney, Agent, or Firm* — Marsh Fischmann & Breyfogle LLP; Bobby Soltani; Kent A. Lembke (57) ABSTRACT

Systems and methods ("utility") for providing more accurate clock skew measurements between multiple CPUs in a multiprocessor computer system by utilizing the cache control or management protocols of the CPUs in the multiprocessor system. The utility may utilize a time stamp counter (TSC) register of the CPUs in the multiprocessor computer system to detect the clock skew between the various CPUs in the system. Further, the delay between measurements of the TSC registers of the CPUs may be minimized by utilizing the features of the hardware cache control or management protocols of the computer system, thereby providing more accurate clock skew measurements.

19 Claims, 6 Drawing Sheets

CLOCK SKEW MEASUREMENT FOR MULTIPROCESSOR SYSTEMS

BACKGROUND OF THE INVENTION

Traditionally, computer software has been written for serial execution. That is, a computer algorithm was constructed and implemented as a serial stream of instructions. These instructions may have been executed on a single central processing unit (CPU) that is part of a computer system to perform a desired function.

More recently, computer systems that include multiple processors have been developed, and may be operative to implement parallel computing functionality. Parallel computing is a form of computation in which multiple calculations or operations are carried out simultaneously, operating on the principle that larger problems can often be divided into smaller ones, which are then solved concurrently.

Generally, parallel computer systems may be classified according to the level at which the hardware of the computers supports parallelism. For example, some multi-processor computers include multiple processing elements (e.g., multiple CPUs) within a single machine. Conversely, other computer systems use multiple individual computers to work on the same task (e.g., clusters, massive parallel processors (MPP), grids, and the like).

Often, it may be necessary or desirable to determine the amount of time that a certain task or process takes to execute on a computer system. One way to achieve this is to measure the number of clock cycles of a CPU clock that have elapsed between the start and end of a task to be measured. Then, using a known frequency of the CPU clock and the number of clock cycles elapsed during the task, software may calculate the elapsed time to execute the task.

While using a CPU clock to measure the elapsed time for a task executing on a single CPU is advantageous, problems may arise in a multiprocessor system because the clocks of each CPU in the multiprocessor system may not be synchronized with each other. For example, during a system reset, the individual CPUs may be reset at slightly different times. The difference between a value of one processor clock and a value of another processor clock is termed "clock skew." For example, if the "start time" for a process or task is measured on one CPU and the "end time" for the process is measured on a different CPU, the clock skew between the two CPUs may yield an inaccurate calculation for the execution time for the process. Therefore, it may be desirable to account for the clock skew between the CPUs of a multiprocessor system so that accurate process time measurements may be made.

SUMMARY OF THE INVENTION

The present invention addresses the above and other problems by providing methods and systems for providing more accurate clock skew measurements between multiple CPUs in a multiprocessor computer system by utilizing the cache control protocols of the CPUs in the multiprocessor system. In this regard, delays introduced by handshaking protocols between program code executing on multiple processors during clock skew measurements may be reduced or eliminated. Various features and embodiments of the present invention are described in detail below.

According to a first aspect of the present invention, a computer implemented method for determining a clock skew value between multiple processors in a multiprocessor computer system (MPC) is provided. The MPC may include a first processor having a first clock, a first cache, and a first cache control module, and a second processor having a second clock, a second cache, and a second cache control module. The computer implemented method may include first causing the second cache control module to modify data in the second cache by executing program code on the first processor, and first measuring a characteristic of the first clock by executing program code on the first processor. The method may also include first detecting when the data in the second cache has been modified by executing program code on the second processor, and second measuring a characteristic of the second clock dependent upon the time the data in the second cache is modified by the second cache control module. In addition, the method may include first calculating a clock skew value between the first processor and the second processor by executing program code on the MPC to process the characteristics of the first clock and the second clock.

According to a second aspect of the present invention, a multiprocessor computer system (MPC) is provided. The MPC may include a first processor having a first clock, a first cache, and a first cache control module, and a second processor having a second clock, a second cache, and a second cache control module. The MPC may further include memory that stores program code that is executed by the MPC to first execute on the first processor to cause the second cache control module of the second processor to modify data in the second cache, and to first measure a time stamp counter (TSC) value of the first clock, wherein the TSC value corresponds to a number of clock cycles elapsed since the last reset of the first processor. The program code may also be executed by the MPC to second execute on the second processor to detect when the data in the second cache is modified, and to second measure a TSC value of the second clock dependent upon the time the data in the second cache is modified by the second cache control module, wherein the TSC value corresponds to a number of clock cycles elapsed since the last reset of the second processor. In addition, the program code may also be executed by the MPC to calculate a clock skew value between the first processor and the second processor by executing program code on the MPC to calculate a difference between the measured TSC values for the first clock and the second clock.

According to a third aspect of the present invention, a computer readable medium embodying computer program code executable on a multiprocessor computer system (MPC) is provided. The MPC may include a first processor having a first clock, a first cache, and a first cache control module, and a second processor having a second clock, a second cache, and a second cache control module. The computer program code may include computer executable instructions configured to first execute on the first processor to cause the second cache control module of the second processor to modify data in the second cache, and to first measure a characteristic of the first clock by executing instructions on the first processor. The computer executable instructions may also be configured to second execute on the second processor to detect when the data in the second cache is modified, and second measure a characteristic of the second clock dependent upon the time the data in the second cache is modified by the second cache control module. Further, the computer executable instructions may be configured to calculate a clock skew value by processing the characteristics of the first clock and the second clock.

In addition to the exemplary aspects and embodiments described above, further aspects and embodiments will become apparent by reference to the drawings and by study of the following descriptions.

DETAILED DESCRIPTION

Embodiments of the present invention are directed to methods and systems for providing more accurate clock skew measurements between multiple CPUs in a multiprocessor computer system by utilizing the cache control protocols of the CPUs in the multiprocessor system. Specific details of various aspects and embodiments of the present invention are described below in relation to FIGS. 1-6. It should be appreciated that such illustration and description is to be considered as exemplary and not restrictive in character. For example, certain embodiments described hereinbelow are depicted in regard to a specific processor, register, or other feature or components of computer systems, but it is contemplated that the various aspects of the present invention may have applications using other configurations. As another example, the various functions provided by program code may be executable on one or more processors of the multiprocessor system, or any suitable combination thereof.

Figure 1:
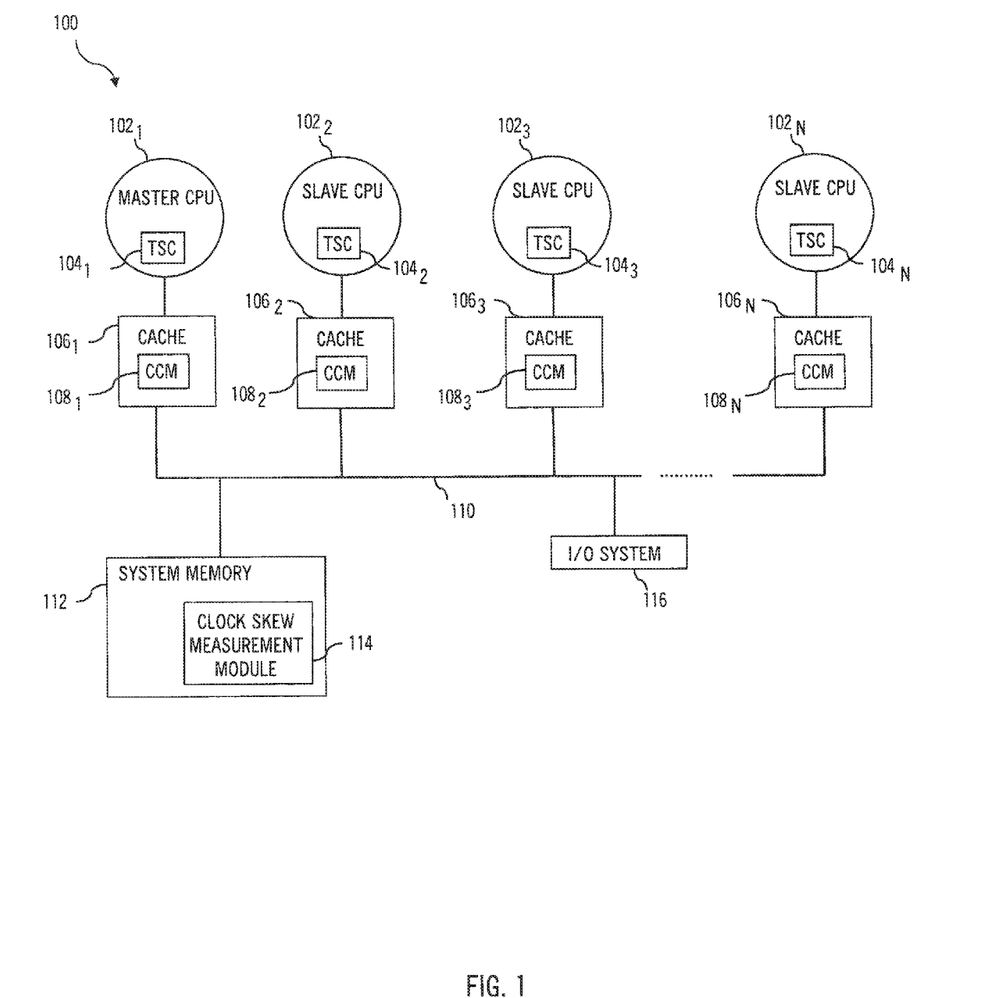
FIG. 1 illustrates a block diagram of an exemplary multiprocessor computer system.

FIG. 1 illustrates a block diagram of a multiprocessor computer system (MPC) 100 that includes N CPUs $102_{1-N}$ (i.e., a master CPU $102_1$ and slave CPUs $102_{2-N}$) in accordance with one or more embodiments of the present invention. Each of the CPUs $102_{1-N}$ may include a high frequency clock, and may be an x86 type processor for example. The CPUs $102_{1-N}$ each include a Time Stamp Counter (TSC) register $104_{1-N}$, which may be a 64 bit register that counts the number of ticks of a clock for its associated CPU since the last reset. Reading the TSC registers $104_{1-N}$ may be a high-resolution, low-overhead method for getting CPU timing information. For example, if the TSC register 104 of a CPU 102 is read before and after a task or process is executed, the difference between the first and second readings may be indicative of the execution time for the task or process. As can be appreciated, the TSC registers $104_{1-N}$ may be incremented each clock cycle, or any predetermined multiple thereof depending on the specific implementation by the CPUs $102_{1-N}$ of the MPC 100.

The MPC 100 further includes system memory 112 which may include any read/write storage device such as random access memory (RAM), non-volatile storage devices, such as disk or tape storage devices, or any combination thereof. The MPC 100 may also include an I/O system 116 which may include devices and/or interfaces for devices for the input and output of data. Such devices may include a keyboard, a mouse, a display, network connections, and the like. The CPUs $102_{1-N}$, the system memory 112, and the I/O system 116 may communicate with each other via a bus 110.

Each of the CPUs $102_{1-N}$ may also include a cache $106_{1-N}$ (e.g., one or more levels of cache memory) and associated cache control module (CCM) $108_{1-N}$ (or "cache manager").

The caches $106_{1-N}$ may be used by the CPUs $102_{1-N}$ to reduce the average time required to access data stored in the system memory 112. In this regard, the caches $106_{1-N}$ may be smaller in size than the system memory 112, and may have a much faster access time. The caches $106_{1-N}$ may store copies of the data from the most frequently used locations in system memory 112. Thus, if many or most of the memory accesses by the CPUs $102_{1-N}$ are cached memory locations, the average latency of memory accesses for the MPC 100 will be closer to the cache latency time than to the system memory latency time.

In operation, when a CPU 102 needs to read or write a location in the system memory 112, the CPU (or CCM) may first check whether that memory location is in its local cache 106. For example, this may be accomplished by comparing the address of the memory location to tags (e.g., an index or address of the data in system memory 112) in the local cache 106 that might contain that address. If the CPU 102 finds that the memory location is in the cache 106 (i.e., a "cache hit"), the CPU 102 may immediately read or write the data. If the CPU 102 finds that the memory location is not in the cache 106 (i.e., a "cache miss"), then the CCM 108 may transfer the requested data from the system memory 112 to the cache 106. As can be appreciated, cache misses are relatively slow because they require the data to be transferred from system memory 112, which has a slower access time than the cache 106, and also because the data must be recorded in the cache 106 before it is delivered to the CPU 102.

As can be appreciated, when the multiple CPUs 102 maintain individual caches 106 of a shared memory 112, problems may arise with inconsistent data. For example, if the CPU $102_2$ has a copy of a memory block from a previous read, and the CPU $102_3$ changes that memory block, the CPU $102_2$ may be left with an invalid cache of memory ("invalid cache line") without notification of the change. To solve this problem, a "cache coherency" protocol may be implemented by the MPC 100 that is operative to manage such conflicts and maintain consistency between the local caches 106 and the system memory 112.

One protocol that may be used for cache coherency is generally referred to as "snooping." Snooping is the process whereby individual caches monitor address lines for accesses to memory locations that they have cached. When a write operation is observed to a location that a cache has a copy of, the CCM of that cache invalidates its own copy of the snooped memory location. The CCM may then fetch a valid copy of the snooped memory location from the system memory so that the associated CPU may access valid data. Of course, the features and embodiments of the present invention are not limited to utilizing snooping protocols for cache coherency, and it should be appreciated that other protocols may be implemented (e.g., directory based coherence, snarfing, or the like).

In operation, the MPC 100 may execute software routines including operating system software and application software on the plurality of CPUs 102. The software routines may be stored in the system memory 112, and instructions and data may be transferred between the system memory 112 and the CPUs 102 through the bus 110. The system memory 112 may include a clock skew measurement module 114 that is operative to measure the clock skew between the plurality of CPUs 102. A more detailed description of various embodiments of the clock skew measurement module 114 is provided below with reference to FIGS. 2-6.

Figure 2:
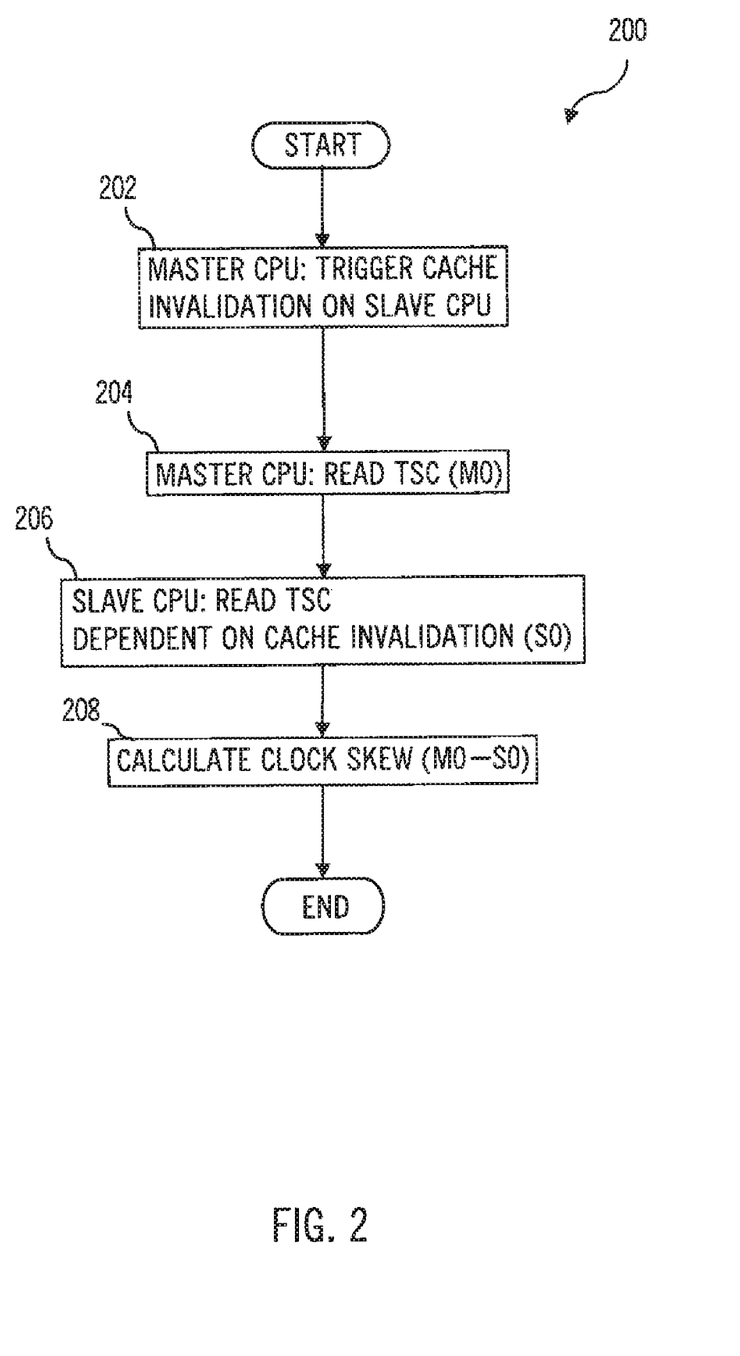
FIG. 2 illustrates a process for measuring the clock skew between two CPUs in a multiprocessor computer system.

FIG. 2 illustrates one embodiment of a process or protocol 200 for measuring the clock skew between two CPUs of an MPC. In this example, one of the CPUs is termed "master CPU" to designate the CPU that primarily controls the protocol 200, and the other CPU is termed "slave CPU" to designate the CPU that is controlled by the Master CPU. Initially, instructions may be executed on the master CPU that have the effect of triggering an invalidation of a cache line associated with the slave CPU (step 202). As an example, the master CPU may issue a write to a global variable that is also stored in the local cache of the slave CPU, which may cause the cache line invalidation in the cache of the slave CPU (see FIG. 4 and related description).

Next, the master CPU may read the master TSC register to obtain a TSC value M0 (step 204), which may represent the number of clock cycles elapsed on a clock of the master CPU since the last system reset. Further, the TSC register on the slave CPU may be read (step 206) to provide a TSC value S0 dependent on the time that the slave CPU detects the cache line invalidation.

After M0 and S0 have been obtained, the clock skew between the master CPU and slave CPU may be calculated (step 208). For example, the clock skew may be calculated to be the difference between M0 and S0. Then, the protocol 200 may be repeated between the master CPU and any other slave CPUs associated with the MPC so that the clock skews between the various CPUs of the MPC may be calculated.

Once the clock skew values have been calculated, the execution times for various tasks or processes may be more accurately determined using the TSC registers of the various CPUs along with the clock skew values determined by the process 200. As an example, if the start time of a process is measured on a first CPU and the end time on a second CPU, the run time for the process may be determined using the TSC register readings of the first and second CPUs, together with the calculated clock skew between them.

It may be desirable to accurately measure the execution time of one or more tasks or processes for a variety of reasons. For example, a developer may want to optimize the performance of a certain process or task, and an accurate measurement of the execution time may be needed. As another example, the execution time of one or more tasks may be used to determine the performance of one or more multiprocessor computer systems relative to each other. Those skilled in the art will readily recognize that an accurate measurement of the execution time for one or more processes or tasks may be desirable in various circumstances.

As can be appreciated, in order to obtain the most accurate clock skew measurements, it may be desirable to minimize the delay between the read of the master CPU TSC register value M0 and read of the slave CPU TSC register value S0. In this regard, using the CCM of the local cache associated with the slave CPU to control the timing for reading the slave TSC register allows the two TSC registers to be read very close together in time. In the example shown in FIG. 4, the slave CPU TSC register is continuously read in a loop, such that slave CPU TSC register does not have to be read after the cache line invalidation is detected. Rather, the TSC register value read just prior to the detection of the cache line invalidation may be used to calculate the clock skew value, thereby eliminating the undesirable read delay that would otherwise be present.

Figure 3:
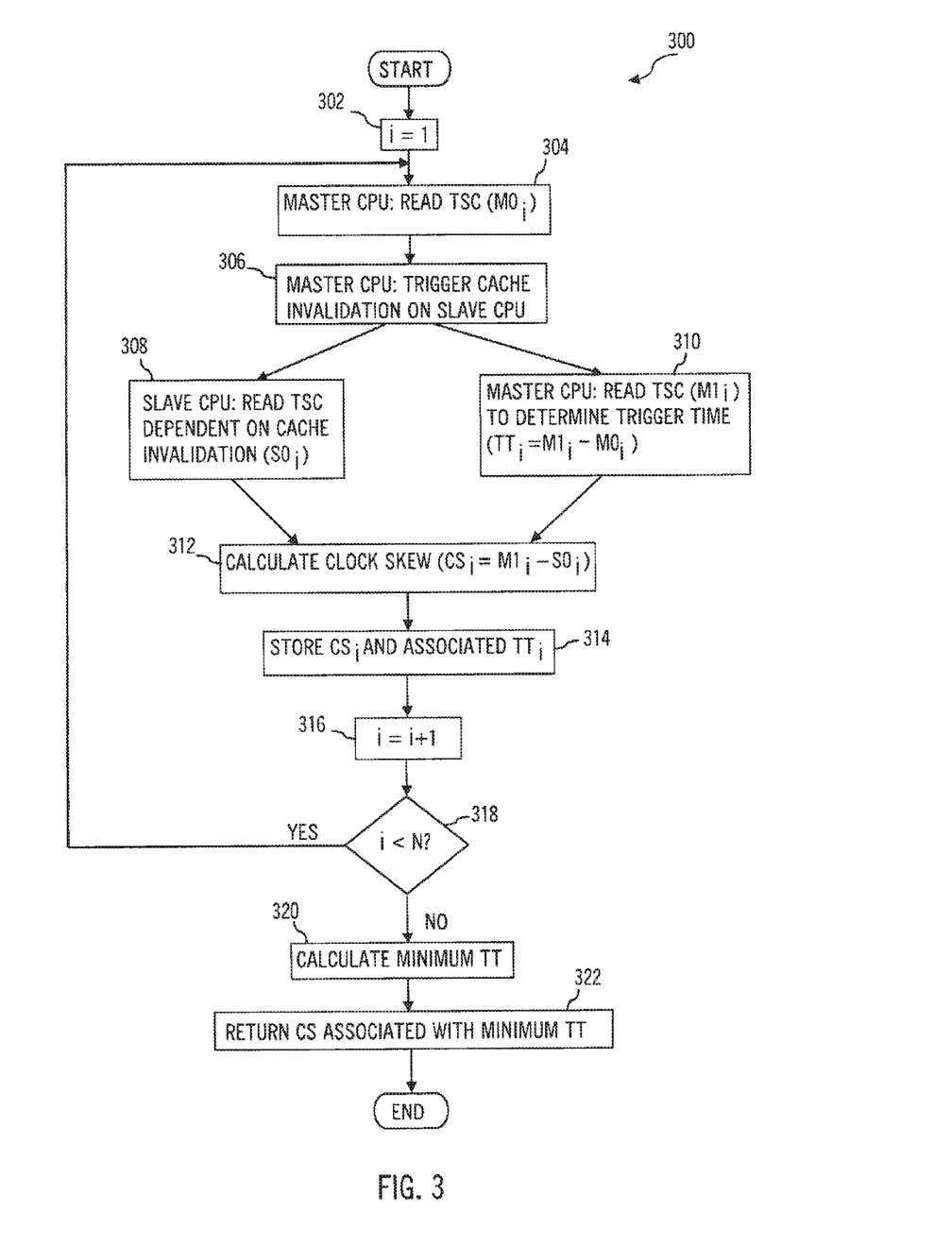
FIG. 3 illustrates another process for measuring the clock skew between two CPUs in a multiprocessor computer system.

FIG. 3 illustrates another process or protocol 300 for calculating a clock skew between a master CPU and a slave CPU. In this embodiment, the time delay between the TSC register readings on the two CPUs is further minimized by minimizing the delay introduced by the master CPU causing the cache line invalidation on the slave CPU.

Initially, a loop control variable "i" is set to 1 (step 302). Next, the master CPU reads the TSC register to obtain a TSC value $M0_i$ (step 304), which may be used to determine the time elapsed ("trigger time" ($TT_i$)) during a cache invalidation triggering step 306 (step 310). Once the master CPU has read its TSC register, the master CPU may then trigger a cache line invalidation on the slave CPU (step 306). Next, the master CPU may take another reading of the TSC register to obtain a TSC value $M1_i$, so that the clock skew value may be calculated.

In parallel with step 310, at step 308, the slave CPU may read its TSC register dependent upon when the CCM for the slave CPU detects the cache line invalidation caused by the master CPU in step 306. The slave CPU may store this TSC register reading as TSC value $S0_i$. As noted above in reference to the protocol 200 shown in FIG. 2, using the CCM of the slave CPU may reduce the delay between when the master TSC register value $M1_i$ is read and when the slave TSC register value $S0_1$ is read, thereby allowing for a more accurate clock skew value $CS_i$ to be calculated (step 312).

After the clock skew value $CS_i$ and associated trigger time $TT_i$ has been calculated for an iteration of the loop, they may be stored in memory (step 314). Next, the loop may be repeated a predetermined number (N) of times (steps 316 and 318) to generate a plurality of clock skew values $CS_i$ and associated trigger times $TT_i$. As can be appreciated, N may be any suitable integer such as 10, 100, 1000, or the like. Since a greater trigger time TT corresponds to a longer delay between the readings of the master and slave TSC registers, and therefore a more inaccurate measurement of clock skew, the minimum trigger time TT is then calculated to identify the most accurate clock skew value $CS_i$ (step 320). Finally, the clock skew value CS is assigned to the $CS_i$ associated with the minimum $TT_i$ (step 322), so that an accurate clock skew measurement may be provided.

Figure 4:
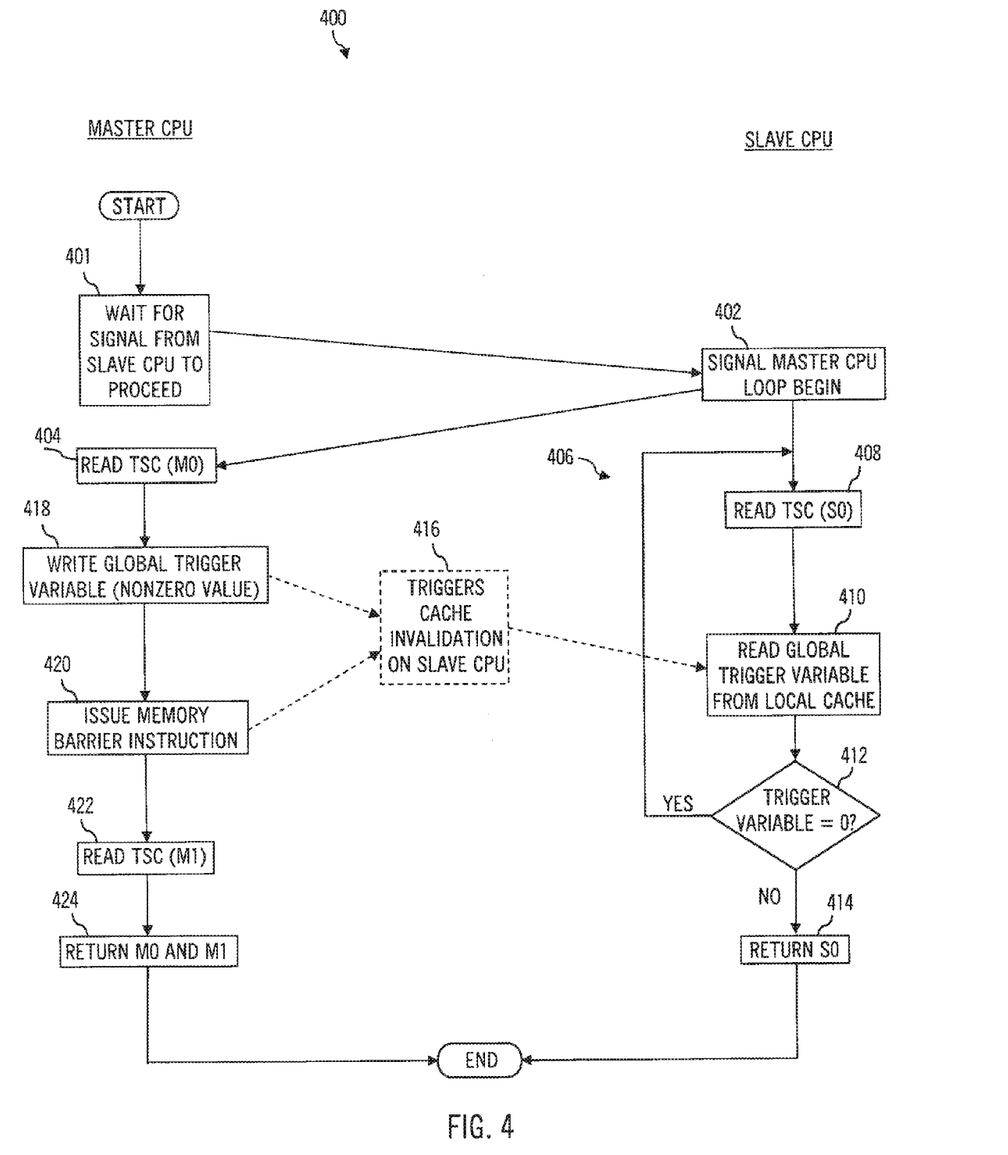
FIGS. 4 and 5 illustrate another process for measuring the clock skew between two CPUs in a multiprocessor computer system.
Figure 5:
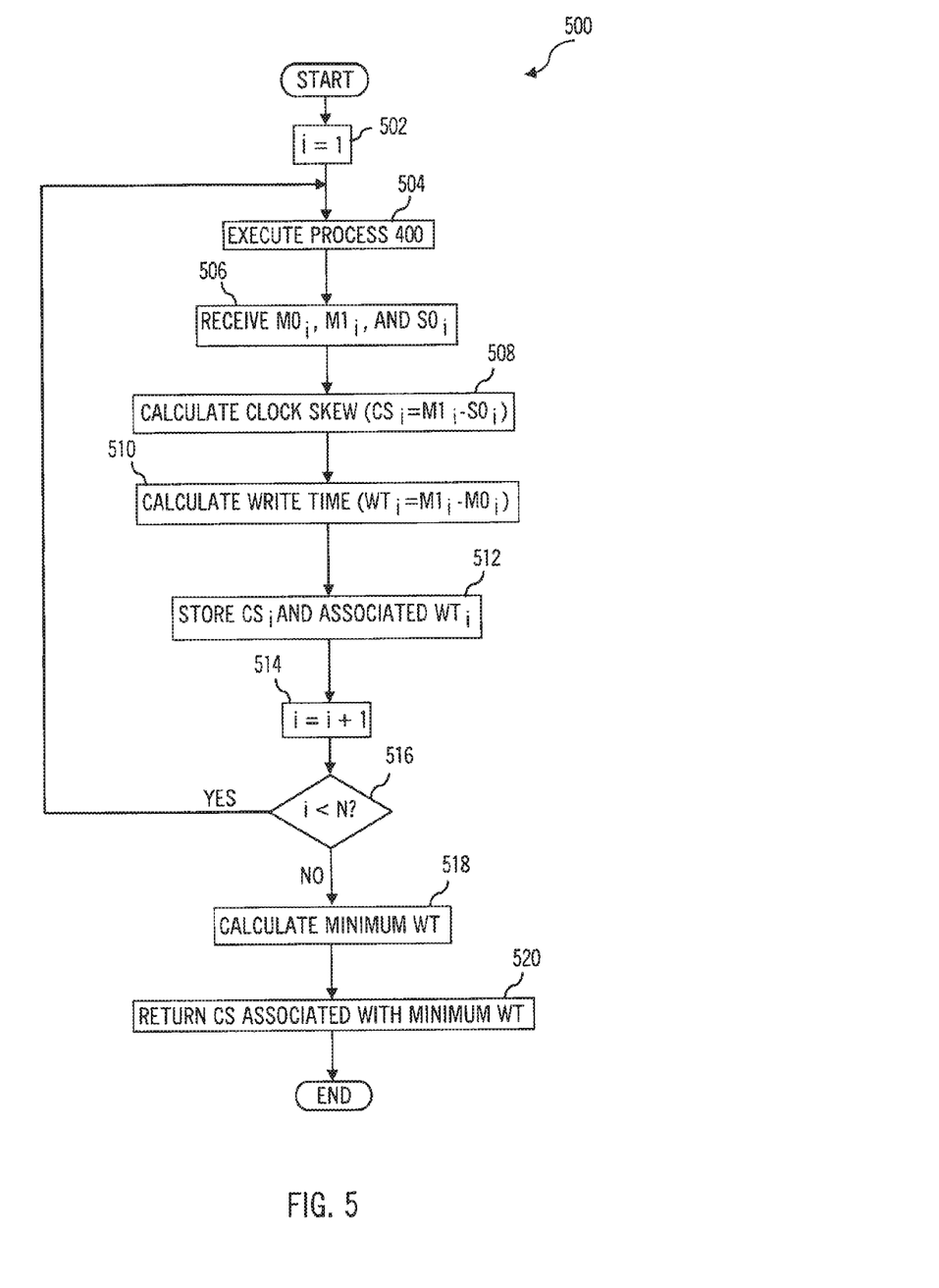

FIGS. 4-5 illustrate another implementation (methods or protocols 400 and 500) for executing a clock skew measurement between a master CPU and a slave CPU. Initially, the master CPU may wait for a signal from the slave CPU indicating that it has entered a loop 406 (step 401). In response to this signal, the slave CPU may signal back to the master CPU indicating that it is entering the loop 406 (step 402). Generally, the loop 406 may include continuously reading the slave CPU's TSC register value S0 (step 408), reading a global trigger variable from the slave CPU's local cache (step 410), and detecting a change in the global trigger variable to determine when to exit the loop 406 (step 412).

In parallel with the loop 406 that is executed on the slave CPU, the master CPU may read its TSC register value M0, and then immediately issue a write to the global trigger variable (step 418). As an example, the master CPU may write a nonzero value to the global variable. This action may operate to trigger a cache line invalidation in the local cache of the slave CPU that contains the global trigger variable (see dashed block 416), which in turn may cause the instructions executing on the slave CPU to exit the loop 406, thereby returning the TSC value S0 read from the slave CPU's TSC register immediately before the cache line invalidation was detected (step 414).

To ensure that the write to the global trigger variable reaches global visibility relatively soon, and thus TSC value S0 will be read close in time to the TSC value M1, the master CPU may also issue a memory barrier instruction (step 420). Generally, a memory barrier instruction is one that causes the CPU to enforce an ordering constraint on memory operations issued before and after the barrier instruction.

Once the master CPU has issued the write instruction and memory barrier instruction (steps 418 and 420), the master CPU TSC register may be read to obtain a TSC value M1 for use by the protocol 500 shown in FIG. 5 (step 422). Finally, the master CPU may provide the two TSC register values M1 and M0 to the protocol 500 (step 424) so that a clock skew value may be calculated by the protocol 500 shown in FIG. 5.

Similar to the protocol 300 shown in FIG. 3, the process or protocol 500 may be used to calculate an accurate clock skew value between a master CPU and a slave CPU. Generally, the protocol 500 may be operative to calculate multiple clock skew values, and to select a most accurate clock skew value from the multiple clock skew values. More specifically, a loop counter variable "i" for a loop may be initially set to equal 1 (step 502). Next, the protocol 500 may execute the protocol or process 400 shown in FIG. 4 (step 504) and receive the TSC register values $M0_i$, $M1_i$, and $S0_i$ (step 506). Then, using the master CPU TSC value $M1_i$ and the slave CPU TSC value $S0_i$, a clock skew value $CS_i$ may be calculated for one iteration of the loop (step 508).

The protocol 500 may also use the master CPU TSC values $M0_i$ and $M1_i$ to determine the time elapsed from when the master CPU issued the write and memory barrier instructions (steps 418 and 420 shown in FIG. 4). This may generally be referred to as the write time ($WT_i$). As can be appreciated, the difference between $M0_i$ and $M1_i$ represents the time elapsed during the steps 418 and 420.

Next, the protocol 500 may store the clock skew value $CS_i$ and the associated write time $WT_i$ in memory (step 512). Steps 504 to 514 of the protocol 500 may then repeat N times, creating N clock skew values $CS_i$ and N associated write times $WT_i$ (steps 514 and 516). Then, since the write time WT introduces error in the clock skew measurement and may be widely varying due to bus arbitration, contention between devices on the bus, and the like, the minimum write time WT of the N write times $WT_i$ may be calculated (step 518). In this regard, the clock skew value $CS_i$ associated with the minimum write time WT may be selected, thereby providing the clock skew value CS that is least affected by the write time WT, and therefore providing the most accurate clock skew measurement (step 520).

Figure 6:
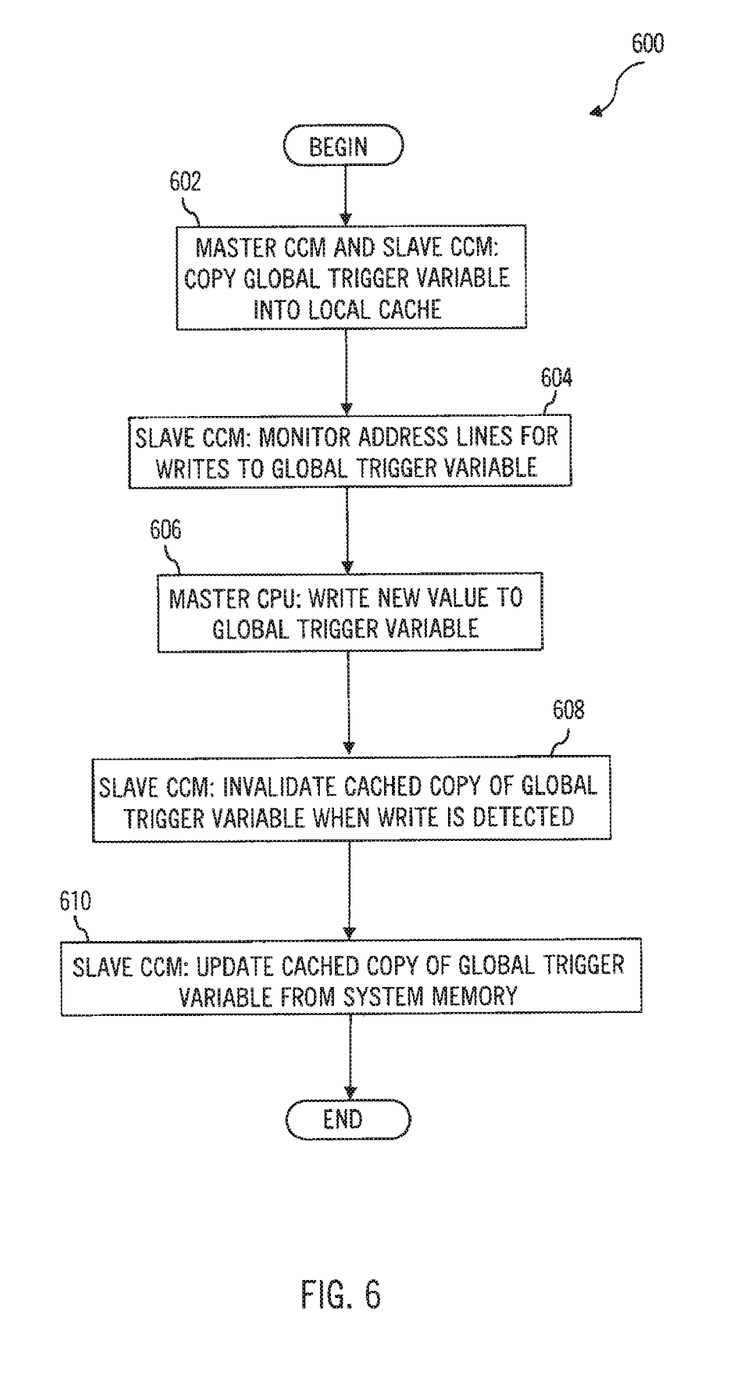
FIG. 6 illustrates a snooping protocol that may be used in one or more processes for measuring the clock skew between two CPUs in a multiprocessor computer system.

FIG. 6 illustrates one example of a bus snooping protocol 600 that may be used for detecting the cache line invalidations in the clock skew measurement protocols described herein. Initially, a global trigger variable may be copied into the local caches by the cache control modules (CCM) of the master and slave CPUs (step 602). Then, the CCM of the slave CPU may monitor the address lines of the address bus for writes to the global trigger variable (step 604). Next, the master CPU may issue a write to the global trigger variable (step 606), causing the CCM of the slave CPU to invalidate the cached copy of the global trigger variable (step 608). Finally, the CCM of the slave CPU may update the cached copy of the global variable from system memory (step 610), such that a process executing on the slave CPU may detect the change in the global trigger variable (see e.g., the loop 406 shown in FIG. 4).

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

We claim:

1. A computer implemented method for determining a clock skew value between multiple processors in a multiprocessor computer system (MPG), the MPC including a first processor having a first clock, a first cache, and a first cache control module, the MPC also including a second processor having a second clock, a second cache, and a second cache control module, the method comprising the steps of:

first causing the second cache control module to modify data in the second cache by executing program code on the first processor;

first measuring a characteristic of the first clock by executing program code on the first processor;

first detecting when the data in the second cache has been modified by executing program code on the second processor;

second measuring a characteristic of the second clock dependent upon the time the data in the second cache is modified by the second cache control module;

first calculating a clock skew value between the first processor and the second processor by executing program code on the MPC to process the characteristics of the first clock and the second clock;

third measuring an execution time associated with the first causing step by executing program code on the first processor;

storing the execution time together with the associated clock skew value;

repeating the first causing step, the first measuring step, the first detecting step, the second measuring step, the first calculating step, the third measuring step, and the storing step N times to generate N execution times and N associated clock skew values, wherein N is an integer;

determining minimum execution time from the N execution times; and providing an improved clock skew value that corresponds to the one clock skew value associated with the minimum execution time.

2. The method of claim 1, wherein the computer system also includes a third processor having a third clock, a third cache, and a third cache control module, the method further comprising:

second causing the third cache control module to modify data in the third cache by executing program code on the first processor;

third measuring a characteristic of the first clock by executing program code on the first processor;

second detecting when the data in the third cache has been modified by executing program code on the third processor;

fourth measuring a characteristic of the third clock dependent upon the time the data in the third cache is modified by the third cache control module; and second calculating a clock skew value between the first processor and the third processor by executing program code on the MPC to process the characteristics of the first clock and the third clock.

3. The method of claim 1, wherein the characteristics of the first clock and the second clock correspond to a number of clock cycles elapsed since the last reset of the first processor and the second processor respectively.

4. The method of claim 3, wherein the first calculating step includes calculating a difference between the numbers of clock cycles elapsed since the last reset of the first processor and the second processor.

5. The method of claim 1, wherein the first causing step includes issuing a write to a global variable that is stored in a system memory of the computer system.

6. The method of claim 5, further comprising:
executing program code on the first processor to cause the first processor to enforce an ordering constraint on memory operations.

7. The method of claim 1, wherein the first cache control module and the second cache control module are implemented in hardware and include snooping protocols.

8. The method of claim 1, further comprising:
providing the improved clock skew value to program code that is executable on the MPC and operative to determine an execution time of a process executing on the MPC using the improved clock skew value.

9. A multiprocessor computer system (MPC) comprising:
a first processor having a first clock, a first cache, and a first cache control module;
a second processor having a second clock, a second cache, and a second cache control module; and
memory that stores program code that is executed by the MPC to:
first execute on the first processor to cause the second cache control module of the second processor to modify data in the second cache;
first measure a time stamp counter (TSC) value of the first clock, wherein the TSC value of the first clock corresponds to a number of clock cycles elapsed since the last reset of the first processor;
second execute on the second processor to detect when the data in the second cache is modified;
second measure a TSC value of the second clock dependent upon the time the data in the second cache is modified by the second cache control module, wherein the TSC value of the second clock corresponds to a number of clock cycles elapsed since the last reset of the second processor;
calculate a clock skew value between the first processor and the second processor by executing program code on the MPC to calculate a difference between the measured TSC values for the first clock and the second clock;
third measure an execution time associated with the first execute step;
store the execution time together with the associated clock skew value in the memory;
repeat the first execute step, the first measure step, the second execute step, the second measure step, the calculate step, the third measure step, and the store step N times to generate N execution times and N associated clock skew values, wherein N is an integer;
determine a minimum execution time from the N execution times; and
provide an improved clock skew value that corresponds to the one clock skew value associated with the minimum execution time.

10. The multiprocessor computer system of claim 9, further comprising:
a third processor having a third clock, a third cache, and a third cache control module; and
wherein the program code is executed by the MPC to:
third execute on the first processor to cause the third cache control module of the third processor to modify data in the third cache;
third measure a second time stamp counter (TSC) value of the first clock, wherein the second TSC value of the first clock corresponds to a number of clock cycles elapsed since the last reset of the first processor;
fourth execute on the third processor to detect when the data in the third cache is modified;
fourth measure a time stamp counter (TSC) value of the third clock dependent upon the time the data in the third cache is modified by the third cache control module, wherein the TSC value of the third clock corresponds to a number of clock cycles elapsed since the last reset of the third processor; and
calculate a clock skew value between the first processor and the third processor by executing program code on the MPC to calculate a difference between the second TSC value of the first clock and the TSC value of the third clock.

11. The multiprocessor computer system of claim 9, wherein the program code is executed by the MPC to cause the first processor to issue a write to a global variable that is stored in the memory of the MPC to cause the second cache control module of the second processor to modify data in the second cache.

12. The multiprocessor computer system of claim 9, wherein the program code is executed on the first processor to cause the first processor to enforce an ordering constraint on memory operations.

13. The multiprocessor computer system of claim 9, wherein the first cache control module and the second cache control module are implemented in hardware and include snooping protocols.

14. The multiprocessor computer system of claim 9, wherein the program code is executed by the MPC to:
provide the improved clock skew value to program code that is executable on the MPC and operative to determine an execution time of a process executing on the MPC using the improved clock skew value.

15. A non-transitory computer readable medium embodying computer program code executable on a multiprocessor computer system (MPC) including a first processor having a first clock, a first cache, and a first cache control module, the MPC also including a second processor having a second clock, a second cache, and a second cache control module, the computer program code comprising computer executable instructions configured to:
first execute on the first processor to cause the second cache control module of the second processor to modify data in the second cache;
first measure a characteristic of the first clock by executing instructions on the first processor;
second execute on the second processor to detect when the data in the second cache is modified;
second measure a characteristic of the second clock dependent upon the time the data in the second cache is modified by the second cache control module;
calculate a clock skew value by processing the characteristics of the first clock and the second clock;
third measure an execution time associated with the first execute step;
store the execution time together with the associated clock skew value in the memory;
repeat the first execute step, the first measure step, the second execute step, the second measure step, the calculate step, the third measure step, and the store step N times to generate N execution times and N associated clock skew values, wherein N is an integer;
determine a minimum execution time from the N execution times; and
provide an improved clock skew value that corresponds to the one clock skew value associated with the minimum execution time.

16. The non-transitory computer readable medium of claim 15, wherein the MPC includes a third processor having a third clock, a third cache, and a third cache control module, wherein the computer program code comprising computer executable instructions is further configured to:
- third execute on the first processor to cause the third cache control module of the third processor to modify data in the third cache;
- third measure a characteristic of the first clock by executing instructions on the first processor;
- fourth execute on the third processor to detect when the data in the third cache is modified;
- fourth measure a characteristic of the third clock dependent upon the time the data in the third cache is modified by the third cache control module; and
- calculate a clock skew value by processing the characteristics of the first clock and the third clock.

17. The non-transitory computer readable medium of claim 15, wherein the computer program code is operative to cause the first processor to issue a write to a global variable that is stored in the memory of the MPC to cause the second cache control module of the second processor to modify data in the second cache.

18. A computer implemented method for determining a clock skew value between multiple processors in a multiprocessor computer system (MPC), the MPC including a first processor having a first clock, a first cache, and a first cache control module, the MPC also including a second processor having a second clock, a second cache, and a second cache control module, the method comprising the steps of:
- first causing the second cache control module to modify data in the second cache by executing program code on the first processor;
- first measuring a characteristic of the first clock by executing program code on the first processor;
- first detecting when the data in the second cache has been modified by executing program code on the second processor;
- second measuring a characteristic of the second clock dependent upon the time the data in the second cache is modified by the second cache control module; and
- first calculating a clock skew value between the first processor and the second processor by executing program code on the MPC to process the characteristics of the first clock and the second clock,
wherein the first causing step includes issuing a write to a global variable that is stored in a system memory of the computer system.

19. The method of claim 18, further comprising:
executing program code on the first processor to cause the first processor to enforce an ordering constraint on memory operations.

* * * * *

UNITED STATES PATENT AND TRADEMARK OFFICE
CERTIFICATE OF CORRECTION

PATENT NO. : 8,122,278 B2
APPLICATION NO. : 12/430992
DATED : February 21, 2012
INVENTOR(S) : Salam et al.

Page 1 of 1

It is certified that error appears in the above-identified patent and that said Letters Patent is hereby corrected as shown below:

Column 8, line 1, delete "MPG" and insert therefor --MPC--.
Column 8, line 31, after "determining", insert --a--.

Signed and Sealed this
Third Day of April, 2012

David J. Kappos
*Director of the United States Patent and Trademark Office*